UNITED STATES PATENT OFFICE.

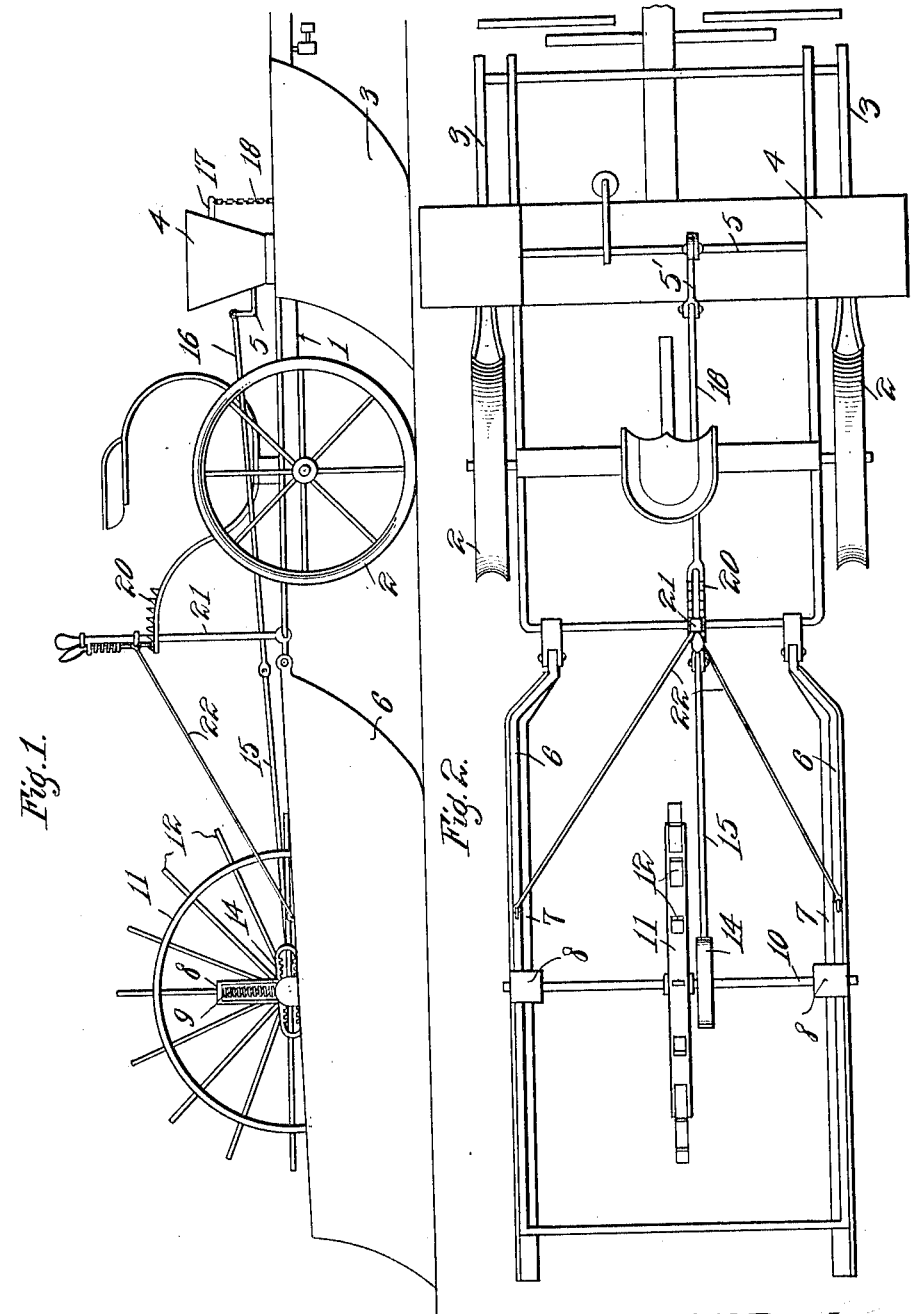

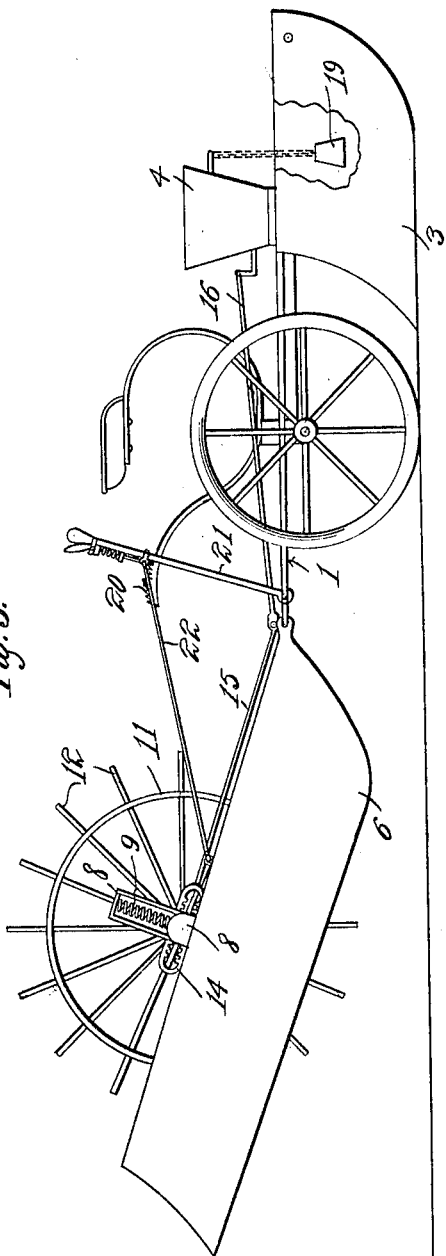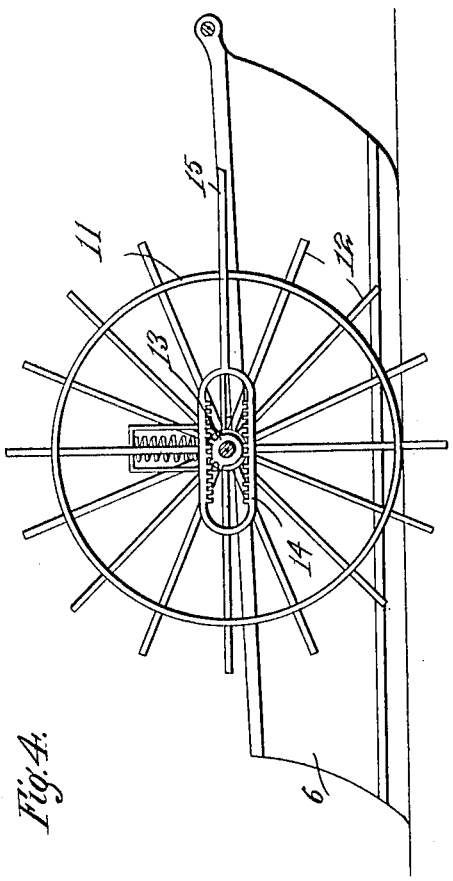

JOHN H. REED, OF LANCASTER, WISCONSIN.

PLANTER.

1,274,447.

Specification of Letters Patent.

Patented Aug. 6, 1918.

Application filed September 6, 1917. Serial No. 189,991.

*To all whom it may concern:*

Be it known that I, JOHN H. REED, a citizen of the United States, residing at Lancaster, in the county of Grant and State of Wisconsin, have invented a new and useful Planter, of which the following is a specification.

The subject of this invention is a planter, and the objects of the invention are, first, to provide an attachment which may be applied to the usual form of check row planter to operate the seed delivering mechanism thereof, second, to provide means for elevating the dropper actuating mechanism when seed is not being planted, third, to provide a simple and efficient planter.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

One practical embodiment of the invention is shown in the accompanying drawings, wherein:

Figure 1 is a side elevation of a planter constructed in accordance with the invention;

Fig. 2 is a plan view;

Fig. 3 is a side elevation showing the parts in inoperative position;

Fig. 4 is a longitudinal section of the attachment.

Referring to the drawings by numerals of reference:

A suitable frame 1 is supported on wheels 2 which are grooved, as shown, after the manner of planter wheels to act as coverers.

To the forward end of the frame 1 are secured the shoes 3 which are formed in any usual manner and act to open a furrow for the reception of the seed. Seated on the frame 1 are the usual seed boxes 4 which discharge between the rearwardly divergent sides of the shoes 3. The usual rocking shaft 5 extends between the seed boxes and operates to open and close the seed delivery ports. An angled crank arm 5' extends rearwardly from this rock shaft in the usual manner.

Pivotally secured to the rear cross bar of the frame 1 is an attached portion consisting of side runners 6 which are formed with inwardly projecting flanges 7 to keep the device from sinking too deeply into the soil. Rising from a median point on the upper edge of each runner 6 is a guide rack or frame 8 in which slides a journaling block, not shown, which block is yieldingly held in its normal position at the lower end of the frame by a compression spring 9.

A shaft 10 is journaled in the sliding blocks and upon this shaft is mounted a wheel 11 the spokes of which extend beyond the rim and are flattened to form blades 12 which will enter the soil and prevent slipping of the wheel, thereby insuring a positive and even turning of the wheel.

A mutilated gear 13 is secured on the shaft 10 and is embraced by a rack yoke 14. A rod 15 extends from the yoke and has its free end pivotally secured to one end of a connecting link 16 the other end of which has pivotal engagement with the upturned end of the crank 5'.

Any preferred form of marker may be made use of to indicate the location of the rows but I prefer to secure an angled crank arm 17 to the rock shaft 5 from which it extends upwardly and then forwardly. From the free end of this crank arm is suspended, by a flexible member such as the chain 18, a weight 19.

Whenever the shaft 5 is rocked the end of crank 17 is turned downwardly and the weight 19 lowered to contact the ground. The impact of the weight upon the ground will cause a mark to be made in the soil.

A toothed rack 20 is suitably supported on the frame 1 and is engaged by the latch of a lever 21 which is connected through the links 22 with the runners 6.

In practice the device is operated in the following manner: The lever 21 is thrown to lower the runners 6 upon the ground which also brings the wheel 11 into operation. As the wheel 11 turns, and with it the shaft 10 and its mutilated gear 13, the yoke 14 is reciprocated back and forth. This movement will cause, through the rod 15 and link 16, a rocking movement of the shaft 5 which will deliver seed in the usual manner. The points of seed delivery will be marked, as described, by the weight 19.

As will be seen, this device may be constructed as a complete planter, or the rear section may be attached to any usual and well known check row planter.

Having thus described the invention, what is claimed as new and sought by Letters Patent, is:

1. A planter comprising, in combination with a wheel supported frame and seed delivering mechanism thereon, runners pivotally secured to the frame, flanges on the runners, a shaft journaled on the runners, a wheel rigid on the shaft and contacting the ground to turn the shaft, a mutilated gear on the shaft, a rack yoke reciprocated by the mutilated gear, and mechanism actuated by the reciprocation of the yoke to operate the seed delivering mechanism.

2. A planter comprising, in combination with a wheel supported frame and seed delivering mechanism thereon, runners secured to the frame, a shaft journaled on the runners, a wheel rigid on the shaft and contacting the ground to turn the shaft, a mutilated gear on the shaft, a rack yoke reciprocated by the mutilated gear, and mechanism actuated by the reciprocation of the yoke to operate the seed delivering mechanism.

3. A planter comprising, in combination with a wheel supported frame and seed delivering mechanism thereon, runners secured to the frame, a shaft journaled on the runners, a wheel rigid on the shaft and contacting the ground to turn the shaft, a mutilated gear on the shaft, a rack yoke reciprocated by the mutilated gear, mechanism actuated by the reciprocation of the yoke to operate the seed delivering mechanism, and a marker operated by the reciprocation of the yoke to indicate the points of seed delivery.

In testimony that I claim the foregoing as my own, I have hereto affixed my signature in the presence of two witnesses.

JOHN H. REED.

Witnesses:
S. H. TAYLOR,
T. OATES.

Copies of this patent may be obtained for five cents each, by addressing the "Commissioner of Patents, Washington, D. C."